United States Patent
Haapoja et al.

(10) Patent No.: US 7,272,366 B2
(45) Date of Patent: Sep. 18, 2007

(54) METHOD AND APPARATUS FOR REDUCING RF FILTER INDUCED DISTORTION IN A WIDE BANDWIDTH WIRELESS SYSTEM BY THE USE OF CHANNEL-DEPENDENT RF FILTER COMPENSATION

(75) Inventors: Sami Haapoja, Helsinki (FI); Marko E. Leinonen, Oulu (FI)

(73) Assignee: Nokia Corporation, Espoo (FI)

( * ) Notice: Subject to any disclaimer, the term of this patent is extended or adjusted under 35 U.S.C. 154(b) by 800 days.

(21) Appl. No.: 10/024,107

(22) Filed: Dec. 17, 2001

(65) Prior Publication Data

US 2003/0114128 A1 Jun. 19, 2003

(51) Int. Cl.
*H04B 1/04* (2006.01)
(52) U.S. Cl. ................... 455/114.2; 455/114.3
(58) Field of Classification Search ............. 455/78, 455/83, 114.1–114.3, 158.1, 227, 231, 284, 455/285, 293, 304, 306, 307, 296
See application file for complete search history.

(56) References Cited

U.S. PATENT DOCUMENTS

| | | | | |
|---|---|---|---|---|
| 5,212,803 A * | 5/1993 | Uddenfeldt et al. | ........ | 455/434 |
| 5,317,595 A | 5/1994 | Ostman | ........... | 375/14 |
| 5,444,738 A * | 8/1995 | Ezuriko | ........... | 375/229 |
| 5,828,701 A | 10/1998 | Henriksson | ........... | 375/233 |
| 5,835,526 A | 11/1998 | Juntti | ........... | 375/11 |
| 5,910,756 A | 6/1999 | Ella | ........... | 333/133 |
| 6,011,812 A | 1/2000 | Laakso et al. | ........... | 375/208 |
| 6,166,601 A * | 12/2000 | Shalom et al. | ........... | 330/151 |
| 6,212,371 B1 * | 4/2001 | Sakuma | ........... | 455/343.3 |
| 6,373,888 B1 * | 4/2002 | Lindoff | ........... | 375/231 |
| 6,584,090 B1 * | 6/2003 | Abdelgany et al. | ........ | 370/342 |
| 6,622,028 B1 * | 9/2003 | Abdelmonem et al. | ..... | 455/561 |

\* cited by examiner

*Primary Examiner*—Melur Ramakrishnaiah
*Assistant Examiner*—Alexander Jamal
(74) *Attorney, Agent, or Firm*—Harrington & Smith, PC

(57) ABSTRACT

A mobile station is constructed to include a transceiver comprising a transmitter circuit having a transmit RF filter that passes a transmit band of frequencies that is partitioned into transmit frequency channels and a receiver circuit having a receiver RF filter that passes a receive band of frequencies that is partitioned into receiver frequency channels. Also included is an antenna coupled through a duplexer to an output of the transmitter circuit and to an input of the receiver circuit. The mobile station further includes circuitry, responsive to a currently selected RF channel, for compensating for a non-ideal operation of the RF filters and the duplexer over a full bandwidth range of the transmit and receive frequencies. The compensating circuitry compensates for RF filter operation in a transmit RF channel that is nearest to the band of receive RF frequencies and/or compensates for RF filter operation in a receive RF channel that is nearest to the band of transmit RF frequencies. The compensation circuitry can be implemented using a digital signal processor (DSP) device or a finite impulse response (FIR) device. In the preferred embodiment the transmit and the receive ranges of frequencies are each about 60 MHz and are each partitioned into 12 frequency channels, and a highest frequency channel in the transmit range of frequencies and a lowest frequency channel in the receive range of frequencies are separated by about 20 MHz.

30 Claims, 3 Drawing Sheets

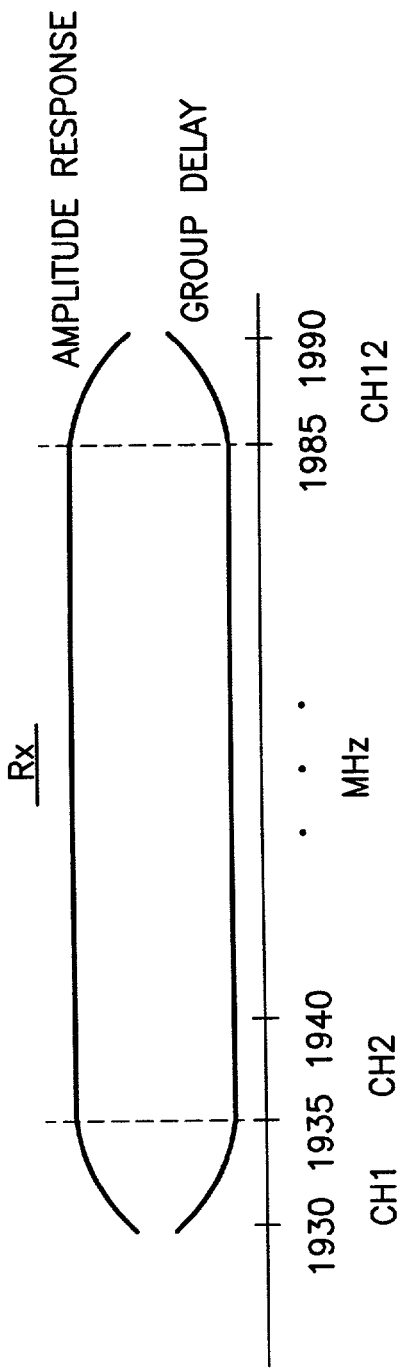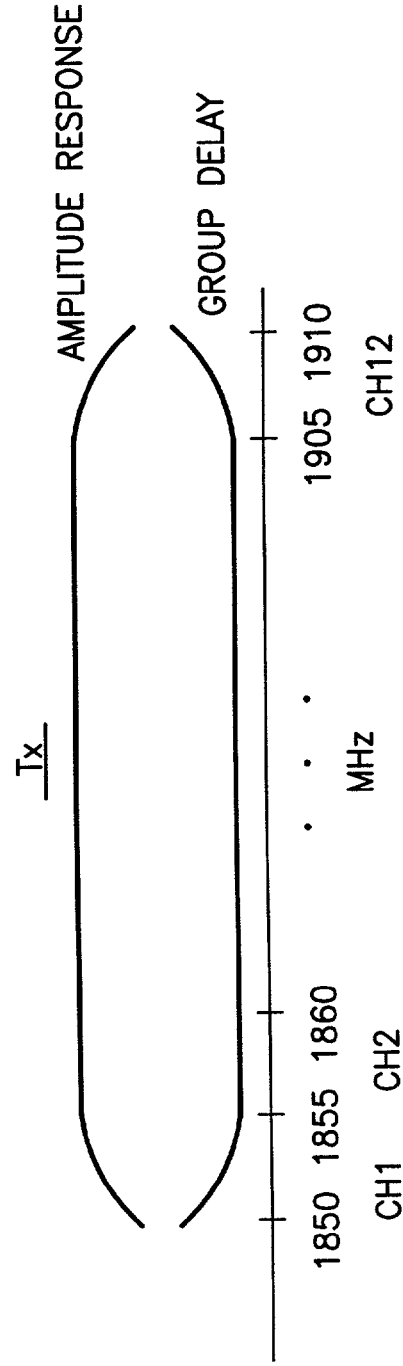

METHOD AND APPARATUS FOR REDUCING RF FILTER INDUCED DISTORTION IN A WIDE BANDWIDTH WIRELESS SYSTEM BY THE USE OF CHANNEL-DEPENDENT RF FILTER COMPENSATION

TECHNICAL FIELD

These teachings relate generally to wireless communications systems such as cellular telecommunications systems and, more specifically, these teachings relate to techniques for mitigating signal distortion due to the presence of RF filters used in wide bandwidth (wideband) transmit and/or receive RF systems.

BACKGROUND

In conventional RF transceivers filtering is used in at least one of the Intermediate Frequency (IF) and Base Band (BB) sections. However, the filtering has been found to induce distortion into the modulated signal due to non-ideal amplitude and phase characteristics of the filters.

The trend is to increase the RF bandwidth in modem RF communication systems, such as the so-called third generation (3G) wireless communication systems. For example, in the wide bandwidth code division multiple access (WCDMA) system each one of the 12, 5 MHz wide RF channels uses a significant proportion of the total bandwidth allocated to the WCDMA system. In the U.S. WCDMA system the receive band (RX) extends from 1930 MHz to 1990 MHZ (a total of 12, 5 MHz wide radio channels) while the transmit band (TX) extends from 1850 MHz to 1910 MHz (also 12, 5 MHz radio channels). There is a 20 MHz spacing between the RX and TX frequency bands (i.e., the frequency range between 1910 MHz and 1930 MHz.)

A problem exists in the lowest RX channel (1930 MHz to 1935 MHz), since the upper end of the TX band (1910 MHz) is only 20 MHz away from lowest-most RX band edge. In order to obtain a high TX band attenuation the antenna-to-RX branch response of the antenna duplexer is required to be quite steep in the lowest RX channel, and the same situation exists for the highest TX channel.

FIGS. 1A and 1B illustrate this problem, and assume the use of 12, 5 MHz wide radio channels in the 1930 MHz to 1990 MHZ and 1850 MHz to 1910 MHz radio frequency bands. It can be seen that the amplitude and phase response of channels 1 and 12 (CH1 and CH12) are very different as compared to the amplitude and phase response of channels 2-11. This is true for both the RF receiver (FIG. 1A) and the RF transmitter (FIG. 1B). If the amplitude response and/or group delay slope in CH1 and CH12 is sufficiently large it can cause distortion in the received signal that is manifested as an increase in the BER (Bit Error Rate). Similarly, on the transmitter side the slope in the amplitude response and/or group delay can cause distortion in the transmitted signal that can be seen in an increase in the EVM (Error Vector Magnitude). It can be shown that the highest TX channel and the lowest RX channel experience the greatest problems resulting from RF band filter distortion.

The implication is that the amplitude and phase distortion induced by the RF band filters becomes an important consideration. This problem is made particularly acute in the WCDMA system for the United States, where the duplex separation between the receive and transmit bands is only 20 MHz, as compared to 130 MHz for the European WCDMA system. Furthermore, both the antenna duplexer component and the RF filters have very similar frequency responses, which compounds the filter-induced amplitude and phase distortion problems. If the RF distortion due to the RF duplexer and/or the RF filters becomes too severe then either one or both of the BER (in the receive side) and the error vector magnitude EVM (in the transmit side) of the RF transceiver is degraded.

In order to obtain high data rate operation a high signal-to-noise ratio (SNR) is required. However, the degradation in the BER due to the RF filter ripple limits the SNR and therefore limits as well the maximum data rates that can be achieved and sustained.

A need thus exists to address and to solve this problem.

SUMMARY OF THE PREFERRED EMBODIMENTS

The foregoing and other problems are overcome, and other advantages are realized, in accordance with the presently preferred embodiments of these teachings.

A mobile station is constructed to include a transceiver comprising a transmitter circuit having a transmit RF filter that passes a transmit band of frequencies that is partitioned into transmit frequency channels and a receiver circuit having a receiver RF filter that passes a receive band of frequencies that is partitioned into receiver frequency channels. Also included is an antenna that may be coupled through a duplexer to an output of the transmitter circuit and to an input of the receiver circuit. The mobile station further includes circuitry, responsive to a currently selected RF channel, for compensating for a non-ideal operation of the RF filters and the duplexer, if present, over a full bandwidth range of the transmit and receive frequencies. The compensating circuitry compensates for RF filter operation in a transmit RF channel that is nearest to the band of receive RF frequencies and/or compensates for RF filter operation in a receive RF channel that is nearest to the band of transmit RF frequencies. The compensation circuitry can be implemented using a programmed digital signal processor (DSP) device or by digital logic, such as a digital ASIC device. In some embodiments it may be desirable to implement the compensation circuitry by a combination of a DSP device and discrete digital logic.

In the preferred embodiment the transmit and the receive ranges of frequencies are each about 60 MHz and are each partitioned into 12 frequency channels, and a highest frequency channel in the transmit range of frequencies and a lowest frequency channel in the receive range of frequencies are separated by about 20 MHz.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1A shows a conventional CDMA (IS-95) RF receiver filter response;

FIG. 1B shows the conventional CDMA RF transmitter filter response;

DETAILED DESCRIPTION OF THE PREFERRED EMBODIMENTS

Figure 2:
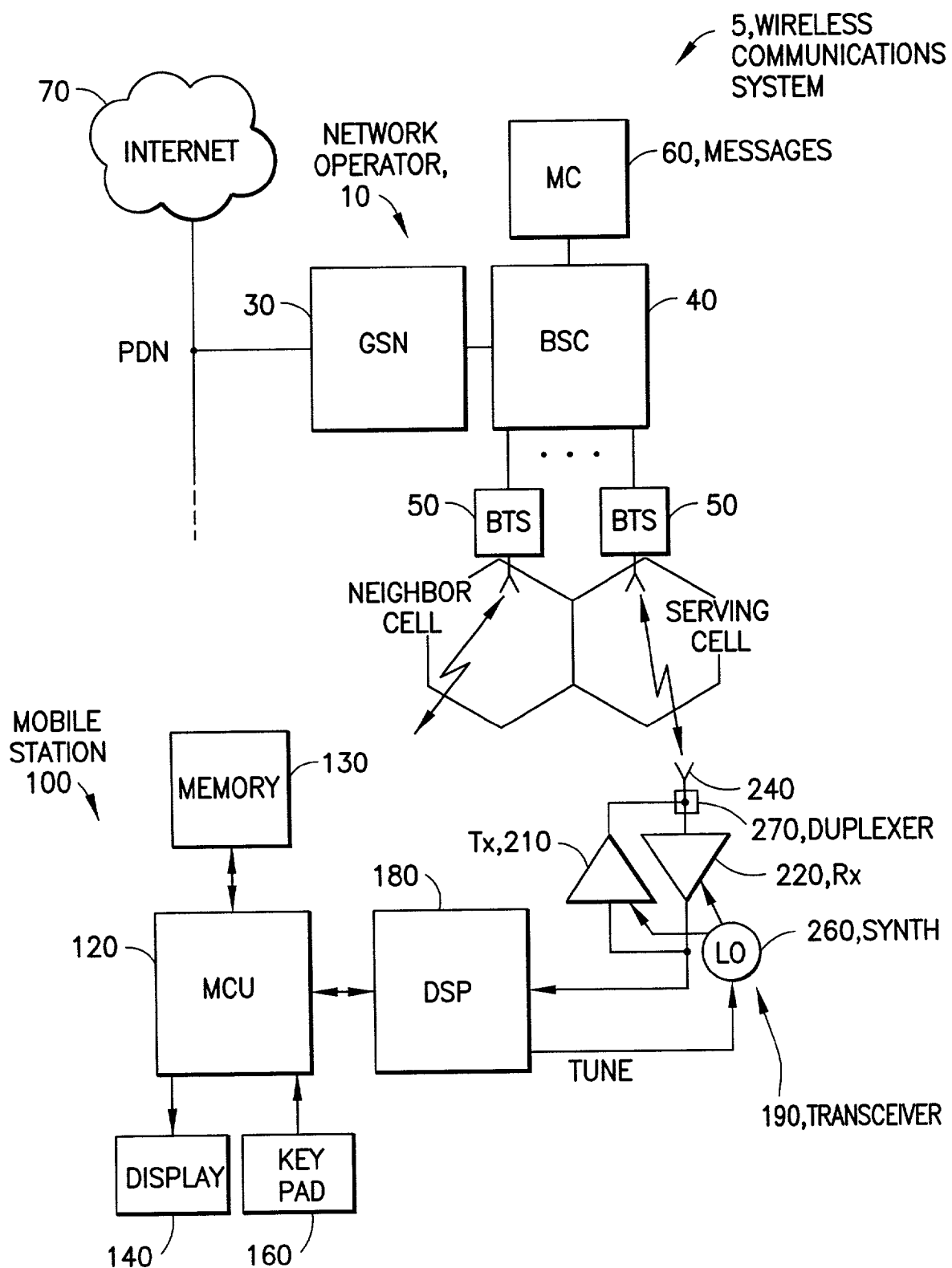
FIG. 2 is a block diagram of a wireless communications system that is suitable for practicing this invention.

Referring to FIG. 2, there is illustrated a simplified block diagram of an embodiment of a wireless communications system 5 that is suitable for practicing this invention. The wireless communications system 5 includes at least one mobile station (MS) 100. FIG. 2 also shows an exemplary network operator having, for example, a Support Node (SN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic.

The air interface standard can conform to any suitable standard or protocol, and may enable both voice and data traffic, such as data traffic enabling Internet 70 access and web page downloads. In the presently preferred embodiment of this invention the air interface standard is a CDMA air interface, and more preferably is a wideband CDMA (WCDMA) system. These teachings are not, however, limited for use with only CDMA wireless communications systems, and may be employed as well with analog frequency division multiplex (FDM), as well as with digital time division multiple access (TDMA) systems.

The network operator may also include a suitable type of Message Center (MC) 60 that receives and forwards messages for the mobile stations 100. Other types of messaging service may include Supplementary Data Services and one under currently development and known as Multimedia Messaging Service (MMS), wherein image messages, video messages, audio messages, text messages, executables and the like, and combinations thereof, can be transferred between the network and the mobile station 100.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to operate in the wireless network with the network operator 10, and may as well provide a suitable user interface (UI), via display 140 and keypad 160, with a user. Although not shown, a microphone and speaker are typically provided for enabling the user to conduct voice calls in a conventional manner.

Of most interest to the teachings of this invention, the mobile station 100 also contains a wireless section that includes a digital signal processor (DSP) 180, or an equivalent high speed processor and/or digital logic, as well as a wireless transceiver 190 that includes a transmitter 210 and a receiver 220, both of which may be coupled via a duplexer 270 to an antenna 240 for communicating with the network operator 10. The duplexer 270, when present, operates to isolate the transmission circuitry and signal from the receiver circuitry, and thereby enables simultaneous transmission and reception to occur, i.e., the MS 100 is capable of full duplex operation. In certain embodiments the functionality of the duplexer 270 may be realized by providing separate transmit and receive filters. At least one local oscillator (LO) 260, such as a frequency synthesizer, is provided for tuning the transceiver. Data, such as digitized voice and packet data, is transmitted and received through the antenna 240.

Reference can be had to, for example, commonly assigned U.S. Pat. No. 5,910,756, issued Jun. 8, 1999, entitled: Filters and Duplexers Utilizing Thin Film Stacked Crystal Filter Structures and Thin Film Acoustic Wave Resonators, by Juha Ella, for a description of duplex filters and construction methods therefor. The disclosure of U.S. Pat. No. 5,910,756 is incorporated by reference herein insofar as there is no conflict with the teachings of this invention.

Figure 3:
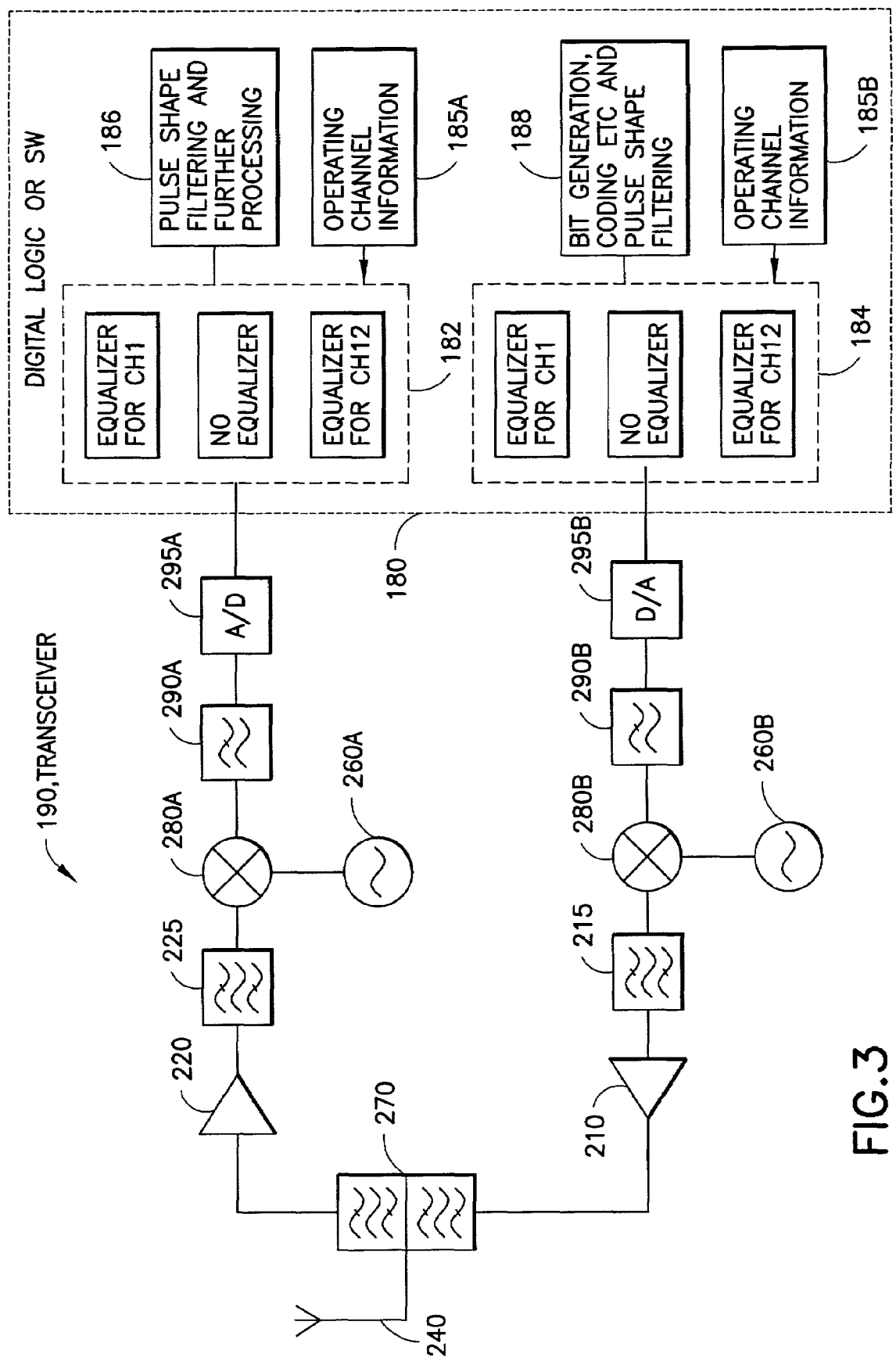
FIG. 3 is a more detailed block diagram of the RF transceiver and DSP of FIG. 2.

Reference is now made to FIG. 3 for showing in greater detail the transceiver 190 of FIG. 2, as well as a portion of the DSP 180. In addition to the transmit amplifier 210, the receive amplifier 220, the duplexer 270 and the antenna 240 shown in FIG. 2, there is at least one downconversion mixer 280A driven by a LO 260A, at least one upconversion mixer 280B driven by a LO 260B, a receive baseband filter 290A, a transmit baseband (BB) filter 290B, and corresponding analog to digital and digital to analog converters 295A, 295B that interface with the digital circuitry, such as the DSP 180. In other embodiments a superheterodyne architecture may be employed wherein there are receive and transmit intermediate frequencies (IFs), and multiple receive and transmit IF and BB filters. That is, these teachings are not limited for use only with the direct conversion type transceiver architecture shown in FIG. 3.

In accordance with the teachings of this invention, when the MS 100 uses the lowest RX (or highest TX) radio channel, the digital filtering properties are changed to compensate for the amplitude and phase distortion due to RF filtering, such as the filtering action that may occur in the antenna duplexer 270, as well as any other RF filters that may be present (as opposed to IF and BB filters). In FIG. 3 two such RF filters are illustrated, where a first RF filter is a transmit passband RF filter 215 coupled between the output of the upconversion mixer 280B and the input to the transmit amplifier 210, and where a second RF filter is a receive passband RF filter 225 coupled between the input of the downconversion mixer 280A and the output of the receive amplifier 220. In other embodiments additional filters (not shown) can be placed between the duplexer 270 and receive amplifier 220, and between the transmit amplifier 210 and the duplexer 270.

In order to correct for the above-described RF filter 215, 225 and/or duplexer 270 induced distortion in the modulation waveform there are equalizers 182 and 184 located in the digital logic, typically implemented in the DSP 180. In this example there are equalizers provided for only channels CH1 and CH12. For the other channels 2-11 no equalizer is required. In other embodiments it may be necessary to provide an equalizer for only the lowest channel (CH1) for the receiver side and/or only for the highest channel (e.g., CH12) for the transmitter side, with the point being that there is at least one channel that requires additional equalization. By example, and while the equalizers 182 and 184 are shown for both the receiver and the transmitter circuit branches of the transceiver 190, in other embodiments it may be desired to only provide the equalizer 182 for one or more channels in the receiver circuitry, or it may be desired to only provide the equalizer 184 for one or more channels in the transmitter circuitry.

In the prior art the distortion due to analog selectivity filtering is corrected by an equalizer that had a similar response across all radio channels (e.g., across channels 1-12). General reference with regard to various prior art equalizers and equalization techniques, including equalizers employed to equalize the signal for RF propagation conditions experienced in the radio channel, can be made to commonly assigned U.S. Pat. No. 6,011,812, issued Jan. 4,2000, entitled: Receiving Method and Receiver, by Laasko et al.; U.S. Pat. No. 5,835,526, issued Nov. 10, 1998, entitled: Channel Equalizer for a Telecommunication System, by Juhani Juntti; U.S. Pat. No. 5,828,701, issued Oct. 27, 1998, entitled: Method and Circuit Arrangement for Compensating for Delayed Components in Transmission Signal, by Jukka Henriksson; and U.S. Pat. No. 5,317,595, issued May 31, 1994, entitled Rapidly Adjustable Channel Equalizer, by Kjell Ostman, the disclosures of which are incorporated by reference herein insofar as there is no conflict with the teachings of this invention.

It is noted that the primary purpose of the equalizers 182 and 184 is not to correct for BB filter 290A, 290B induced signal distortions, but instead to compensate for RF filter-induced distortions, such as those induced by the duplexer 270 and RF filters 215, 225, when operation is required over a wide RF bandwidth. In the preferred embodiment, the distortion is corrected in the same transmitter or receiver digital sections whose RF filter(s) create the distortion.

It should be further noted that the equalizers 182, 184 need not be concerned with providing equalization for a multi-path radio channel, as may be the case for the prior art equalizers referenced above, but instead need only be concerned with minimizing the RF filter induced distortion. For example, the equalizer for CH1 in blocks 182/184 may be a filter whose amplitude and/or phase response is optimized to minimize the receiver/transmitter BER/EVM, respectively, for that particular carrier frequency. Alternatively, the pulse shaping filter response can be changed for CH1 (such as by changing tap values or adding taps) to minimize the BER/EVM.

In a direct conversion receiver, such as the one depicted in FIG. 3, the performance in a full duplex system (i.e., one that requires simultaneous transmission and reception) is limited in large part by distortion in the baseband filter(s), as well as by other factors. It is important to have a very high transmitter frequency rejection in the RF band filters to prevent the unwanted transmitter signal from entering the receiver chain. However, a very high transmitter rejection requires that the receiver RF band filter amplitude response exhibit a very high ripple component in the lowest receive channel when the transmitter frequencies are located below the receiver frequencies in the frequency plane.

The actual implementation of the equalizer(s) 182, 184 is not restricted to any particular type. For example, the equalizers 182, 184 may be embodied in separate blocks in the DSP 180 for which bypassing is accomplished when operating with channels where no equalization is needed. Alternatively, the equalizer(s) 182, 184 may be implemented such that the pulse shaping filter properties are programmably changed for those channels where equalization is desired.

For example, when the receiver 220 is operating on the 1935 . . . 1990 MHz frequency range (channels 2-12 for the exemplary WCDMA 1900 MHz case), or the transmitter 210 is operating on the 1850 . . . 1905 MHz frequency range (channels 1-11), a Finite Impulse Response (FIR) filter can be operated with some number of taps X to produce the proper pulse shaping and selectivity filtering. However, when the receiver 220 is operating on the 1930-1935 MHz frequency range (channel 1), or the transmitter 210 is operating on the 1905-1910 MHz frequency range (channel 12), the FIR filter can be operated with some number of taps X+Y to provide the desired pulse shape and selectivity filtering, as well as to compensate for the amplitude ripple due to the RF filtering.

In accordance with the teachings of this invention the high ripple component in the lowest receiver channel can be tolerated, and the MS 100 can be provided with, for example, a 5 dB to 10 dB higher transmitter rejection.

As an example of the utility of this invention, assume that in the WCDMA embodiment the frequency response of the RF filters results in a SIR (Signal to Interference Ratio) of 28 dBc (max 0.5 dB ripple in a 5 MHz channel). This amount of ripple does not have a significant impact on the sensitivity of the receiver 220, and the SIR of 28 dBc does not have a large impact on the EVM of the transmitter 210. It might be the case, however, that a higher TX rejection is required in the RX branch, resulting in an increase in the ripple at 5 MHz. Furthermore, new modulation types may require a higher SNR or a smaller EVM than the SNR and EVM that are currently acceptable. In this case the exemplary 28 dBc SIR begins to have a more significant impact on the sensitivity of the receiver 220.

The teachings of this invention can then be employed to selectively aid in the rejection of the TX frequency band at the TX/RX band edge, thereby improving the operation of the MS 100. This can be achieved by a reprogramming of the FIR filter characteristics in the receiver 220 to compensate the non-ideal characteristics of the RF filter, such as the duplexer 270.

Because the RF filters 215 and 270 of the transmitter are equally non-ideal, the distortion in the modulation waveform due to these filters is twice the distortion due to a single filter. Thus, in the presently preferred embodiment compensation can be achieved by predistorting the signal to be transmitted in order to maintain the desired accuracy of the modulation. The predistortion can be applied digitally, such as by increasing or decreasing the value of the signal to be transmitted within the signaling bandwidth of interest (implemented by the DSP 180), or by changing the values or the number of the taps of the FIR filter (implemented by the digital BB).

The simplicity of the narrowband modulation lies in the fact that all of the RF filters operate in the same manner for all frequency channels. When the bandwidth of the signal becomes high compared to the RF filter bandwidths (e.g., >10%) the filters do not all operate the same way in all of the frequencies of the pass band. For both the narrowband and the wideband modulation cases, the IF and the BB filter response is the same for all frequency channels.

The problems are overcome by modifying the channel FIR so that the frequency dependency due to RF filters can be compensated. This can be done either by the DSP 180 changing the value of the signal to be transmitted, or by changing the FIR filter characteristics in hardware.

At least one benefit to be derived is improved modulation accuracy, or a higher acceptable ripple for the pass band RF filters can be achieved.

What is claimed is:

1. A mobile station comprising:
   a transceiver comprising a transmitter circuit having a transmit RF filter that passes a transmit band of frequencies that is partitioned into transmit frequency channels and a receiver circuit having a receiver RF filter that passes a receive band of frequencies that is partitioned into receiver frequency channels, wherein the transmit band of frequencies comprises at least one first end channel, at least one second end channel, and interior channels between the first and second end channels, wherein the receive band of frequencies comprises at least one first end channel, at least one second end channel, and interior channels between the at least one first and second end channels; and
   baseband circuitry capable of compensating for a non-ideal RF operation of channels from the transmit and receive bands of frequencies, the baseband circuitry arranged to compensate for the non-ideal operation of said RF filters of at least one of the at least one first and second end channels of the transmit and receive bands of frequencies and arranged to not compensate for the non-ideal RF operation of said RF filters of any of the interior channels of the transmit and receive bands of frequencies.

2. A mobile station as in claim 1, wherein said baseband compensating circuitry compensates for RF filter operation in a transmit RF channel that is nearest to said band of receive RF frequencies.

3. A mobile station as in claim 1, wherein said baseband compensating circuitry compensates for RF filter operation in a receive RF channel that is nearest to said band of transmit RF frequencies.

4. A mobile station as in claim 1, wherein said baseband compensation circuitry is comprised of at least one of digital logic and a digital signal processor (DSP) device.

5. A mobile station as in claim 1, wherein said baseband compensation circuitry is comprised of a finite impulse response (FIR) device, wherein compensating the signal to be transmitted is accomplished by one of the group consisting of changing values of taps of the FIR device and changing a number of taps of the FIR device.

6. A mobile station as in claim 1, where said transmit range of frequencies is about 60 MHz, where said receive range of frequencies is about 60 MHz, and where said transmit range of frequencies and said receive range of frequencies are separated by about 20 MHz.

7. A mobile station as in claim 1, where said transmit range of frequencies is about 60 MHz that is partitioned into 12 frequency channels, where said receive range of frequencies is about 60 MHz that is partitioned into 12 frequency channels, and where a highest frequency channel in said transmit range of frequencies and a lowest frequency channel in said receive range of frequencies are separated by about 20 MHz.

8. A method for operating a mobile station comprising:
   providing the mobile station with a transceiver having a transmitter circuit having a transmit RF filter that passes a transmit band of frequencies that is partitioned into transmit frequency channels and a receiver circuit having a receiver RF filter that passes a receive band of frequencies that is partitioned into receiver frequency channels, wherein the transmit band of frequencies comprises at least one first end channel, at least one second end channel, and interior channels between the at least one first and second end channels, wherein the receive band of frequencies comprises at least one first end channel, at least one second end channel, and interior channels between the first and second end channels; and
   compensating, in a baseband with the capability of compensating non-ideal RF filter operation for both RF receive and transmit channels, the non-ideal operation of said RF filters is provided for at least one of the at least one first and second end channels of the transmit and receive bands of frequencies when the at least one of the at least one first and second end channels is selected and for not compensating the non-ideal operation of said RF filters of the interior channels of the transmit and receive bands of frequencies when one of the interior channels is selected.

9. A method as in claim 8, wherein said step of compensating compensates for RF filter operation in a transmit RF channel that is nearest to said band of receive RF frequencies.

10. A method as in claim 8, wherein said step of compensating compensates for RF filter operation in a receive RF channel that is nearest to said band of transmit RF frequencies.

11. A method as in claim 8, wherein said step of compensating comprises operating at least one of digital logic and a digital signal processor (DSP) device.

12. A method as in claim 8, wherein said step of compensating comprises operating a finite impulse response (FIR) device, wherein the compensating of the signal is accomplished by changing a number of taps of the FIR device.

13. A method as in claim 8, wherein said transmit range of frequencies is about 60 MHz, where said receive range of frequencies is about 60 MHz, and where said transmit range of frequencies and said receive range of frequencies are separated by about 20 MHz.

14. A method as in claim 8, wherein said transmit range of frequencies is about 60 MHz that is partitioned into 12 frequency channels, where said receive range of frequencies is about 60 MHz that is partitioned into 12 frequency channels, and where a highest frequency channel in said transmit range of frequencies and a lowest frequency channel in said receive range of frequencies are separated by about 20 MHz.

15. A circuit comprising means for coupling to a transceiver having a transmitter circuit comprising at least one transmit radio frequency (RF) filter that passes a transmit band of radio frequencies that is partitioned into transmit RF channels and a receiver circuit having at least one receiver RF filter that passes a receive band of radio frequencies that is partitioned into receive RF channels, wherein the transmit RF channels comprise at least one first end channel, at least one second end channel, and interior channels between the first and second end channels, wherein the receive RF channels comprise at least one first end channel, at least one second end channel, and interior channels between the at least one first and second end channels, and means for compensating, in a baseband, for at least one of the first and second end channels of the transmit and receive RF channels when the at least one of the at least one first and second end channels is selected and for not compensating for the non-ideal operation of said RF filters of the interior channels of the transmit and receive RF channels when one of the interior channels is selected, wherein the circuitry is capable for compensating for the non-ideal RF operation of channels from the transmit and receive bands of frequencies.

16. A circuit as in claim 15, embodied at least in part by a programmed digital signal processor.

17. A circuit as in claim 15, where the receiver circuit comprises a direct conversion receiver.

18. A circuit as in claim 15, where a transmit range of frequencies is about 60 MHz, where a receive range of frequencies is about 60 MHz, and where said transmit range of frequencies and said receive range of frequencies are separated by about 20 MHz.

19. A circuit as in claim 15, where a transmit range of frequencies is about 60 MHz that is partitioned into 12 RF channels, where a receive range of frequencies is about 60 MHz that is partitioned into 12 RF channels, and where a highest transmit RF channel and a lowest receive RF channel are separated by about 20 MHz.

20. A circuit as in claim 15, comprising part of a wireless communications device, wherein a signal to be transmitted is compensated by being predistorted digitally.

21. A method as in claim 12, wherein the changing of the number of taps of the FIR device is implemented in a digital baseband that comprises the baseband circuitry.

22. A mobile station comprising:
a transceiver comprising a transmitter circuit having a transmit RF filter that passes a transmit band of frequencies that is partitioned into transmit frequency channels and a receiver circuit having a receiver RF filter that passes a receive band of frequencies that is partitioned into receiver frequency channels, wherein the transmit RF channels comprise at least one first end channel, at least one second end channel, and interior channels between the first and second end channels, wherein the receive RF channels comprise at least one first end channel, at least one second end channel, and interior channels between the at least one first and second end channels; and
baseband circuitry capable of compensating for a non-ideal RF operation of transmit frequency channels and receive frequency channels, wherein the non-ideal RF filter operation is compensated for one of the at least one first and second end channels of the transmit and receive bands of frequencies when selected and the non-ideal RF operation is not compensated for any of the interior channels of the transmit and receive bands of frequencies when selected.

23. A mobile station as in claim 22, wherein only the second end transmit RF channel and only the first end receiver RF channel are compensated by the compensating circuitry.

24. A mobile station as in claim 23, wherein all signals of the transmit RF channels follow a single path through a transmit RF passband filter and all signals of the receive RF channels follow a single path through a receive RF passband filter.

25. A circuit comprising a circuit portion for coupling to a transceiver having a transmitter circuit comprising at least one transmit radio frequency (RF) filter that passes a transmit band of radio frequencies that is partitioned into transmit RF channels and a receiver circuit having at least one receiver RF filter that passes a receive band of radio frequencies that is partitioned into receive RF channels, wherein the transmit RF channels comprise at least one first end channel, at least one second end channel, and interior channels between the at least one first and second end channels, wherein the receive RF channels comprise at least one first end channel, at least one second end channel, and interior channels between the first and second end channels, and a circuit portion, in a baseband, for compensating at least one of the at least one first and second end channels of the transmit and receive RF channels when the at least one of the at least one first and second end channels is selected and for not compensating for the non-ideal operation of said RF filters of the interior channels of the transmit and receive RF channels when one of the interior channels is selected, wherein the circuitry is capable of compensating the non-ideal RF operation of channels from the transmit and receive bands of frequencies.

26. A circuit as in claim 25, wherein the circuit portion for compensating is embodied at least in part by a programmed digital signal processor.

27. A circuit as in claim 25, further comprising part of a wireless communications device, wherein a signal to be transmitted is compensated by being predistorted digitally.

28. A circuit as in claim 25, wherein the at least one of the at least one first and second end channels of the transmit and receive RF channels comprises a transmit RF channel that is nearest to the receive band of RF frequencies and a receive RF channel that is nearest to the transmit band of RF frequencies.

29. A circuit as in claim 25, wherein the at least one of the at least one first and second end channels of the transmit and receive RF channels comprises end channels of the transmit band of RF frequencies and end channels of the receive band of RF frequencies.

30. A mobile station as in claim 1, wherein only one first end channel and only one second end channel of each of the transmit and receive bands of frequencies has an equalizer to compensate for the non-ideal operation of said RF filters and none of any other channel of the transmit and receive bands of frequencies has an equalizer.

* * * * *